United States Patent [19]
Foust

[11] Patent Number: 5,873,241
[45] Date of Patent: Feb. 23, 1999

[54] ROCKET ENGINE AUXILIARY POWER SYSTEM

[75] Inventor: Robert R. Foust, Palm Beach Gardens, Fla.

[73] Assignee: United Technologies Corporation, Hartford, Conn.

[21] Appl. No.: 704,537

[22] Filed: May 23, 1991

[51] Int. Cl.⁶ .................................................. F02K 9/00
[52] U.S. Cl. ............................................................ 60/259
[58] Field of Search ........................... 60/258, 259, 260

[56] References Cited

U.S. PATENT DOCUMENTS

| | | | |
|---|---|---|---|
| 4,771,600 | 9/1988 | Limerick et al. | 60/259 |
| 4,879,874 | 11/1989 | Koyari et al. | 60/259 |
| 4,894,986 | 1/1990 | Etheridge | 60/259 |
| 4,912,925 | 4/1990 | Foust | 60/259 |
| 4,998,410 | 3/1991 | Martinez-Leon et al. | 60/259 |
| 5,003,772 | 4/1991 | Huber | 60/259 |

FOREIGN PATENT DOCUMENTS

| | | | |
|---|---|---|---|
| 232371 | 10/1986 | Japan | 60/259 |

*Primary Examiner*—Charles T. Jordan
*Assistant Examiner*—Theresa M. Wesson
*Attorney, Agent, or Firm*—Christopher T. Hayes

[57] ABSTRACT

Disclosed is a rocket engine which uses pressurized, vaporized propellant from the engine cycle to drive the boost pumps that provide propellants to the primary pumps. Additionally, an accumulator tank is provided which stores some of the pressurized, vaporized propellant and selectively releases the propellant to drive the boost pumps at subsequent engine start-up.

5 Claims, 2 Drawing Sheets

ROCKET ENGINE AUXILIARY POWER SYSTEM

FIELD OF THE INVENTION

This invention relates to rocket engines and particularly to rocket engines utilizing at least one liquid propellant which is vaporized to high pressure gas prior to injection into a combustion chamber.

BACKGROUND

Space launch vehicles, particularly those that are defined as "upper stage" i.e., boosted to a high altitude by one or more "booster" rockets must be highly efficient since their weight and propellants must be carried throughout the mission. Liquid hydrogen is often used in space launch vehicles since it is highly efficient as a propellant when burned with an oxidizer, typically liquid oxygen. High performance turbopumps typically used as primary propellant pumps on upper stage rocket engines to pump the liquid hydrogen and oxygen are sensitive to a characteristic known as net positive suction pressure ("NPSP"). Since the liquid hydrogen and liquid oxygen have boiling point temperatures far below typical ambient temperatures they are continuously boiling. This boiling may be suppressed by increasing the NPSP at the primary pump inlet. One method of increasing NPSP is by pressurizing the propellant tanks and using boost pumps installed at the propellant tank exits. The boost pumps provide the additional pressure necessary at the primary pump inlets during engine start-up, thereby suppressing boiling of the propellants.

FIG. 1 shows a schematic diagram of a typical conventional rocket propulsion system 10 of the prior art. The system includes propellant tanks for liquid hydrogen 11 and liquid oxygen 12 with their associated boost pumps 13, 14 located at the tank exit, typically within the tank volume. Each boost pump 13, 14 is typically driven by a turbine 15, 16 located external to the tank 11, 12. The propellant supply lines 17, 18 transfer propellants from the boost pumps 13, 14 to the primary pumps 19, 20 through inlet valves 21, 22. A regeneratively cooled thrust chamber 23 vaporizes the liquid hydrogen flowing to the thrust chamber through the main propellant line 24. Prior to injection into the thrust chamber, the gaseous hydrogen may be expanded through a primary turbine 25 to drive the primary pumps 19, 20. In some applications, a portion of the gaseous hydrogen may be diverted from the main propellant line 24 and ducted through a bypass line 26 and a check valve 40 to one of the propellant tanks 11 to maintain pressure in the tank 11 as the propellant flows out.

Alternatively, stored gas such as high pressure helium from one or more helium tanks 27 may be used for tank pressurization, in which case it is necessary to reduce the pressure and control the flow of the stored gas using orifices 28 or controllers.

Each boost pump turbine 15, 16 is typically powered by an auxiliary power system including monopropellant stored in a monopropellant tank 29. The monopropellant decomposes in the presence of a catalyst to release energy to drive the turbine 15, 16. However, since the monopropellant tank 29 must be pressurized to force flow through the turbines, the stored gas 27 must typically be used for this purpose. Thus the use of monopropellant adds significant weight and complexity to the rocket engines of the prior art.

What is needed is an auxiliary power system that reduces the weight and complexity of the monopropellant system of the prior art.

SUMMARY OF THE INVENTION

It is therefore an object of the present invention to provide an auxiliary power system for a rocket engine wherein the weight and complexity of the monopropellant system of the prior art is eliminated.

According to the present invention, a rocket engine is provided with a boost pump line through which vaporized propellant is diverted from the engine cycle during normal rocket engine operation and used to drive the boost pumps. The vaporized propellant then flows through a propellant tank pressurization line to provide pressurization of the liquid propellant tank. A portion of the diverted vaporized propellant may be stored under pressure in an accumulator tank connected to the boost pump line, and a control valve provided to selectively control flow of the vaporized propellant into and out of the accumulator tank. A check valve in the boost pump line upstream of the accumulator tank prevents backflow of the vaporized propellant into the engine cycle during engine start-up.

At engine start-up (or restart), the control valve is opened and the gas stored in the accumulator tank flows into the boost pump line, driving the boost pumps until sufficient vaporized propellant is available from the engine cycle to drive the boost pumps. The accumulator tank is then recharged with vaporized propellant from the engine cycle and the control valve is closed until the next engine restart.

Other features and advantages will be apparent from the specification and claims and from the accompanying drawings which illustrate an embodiment of the invention.

BEST MODE FOR CARRYING OUT THE INVENTION

Figure 1:
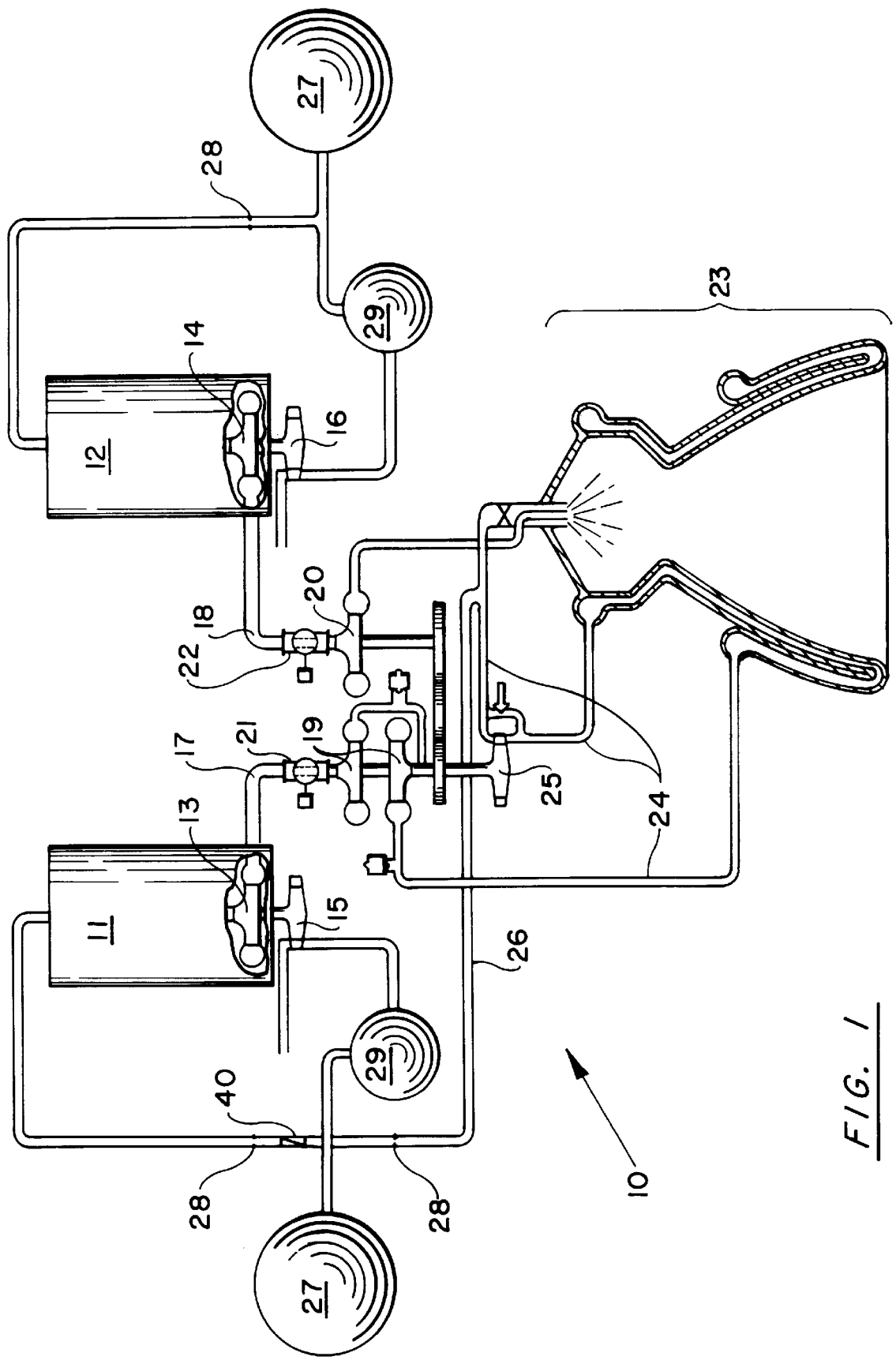
FIG. 1 is a schematic diagram of an expander cycle rocket engine of the prior art.

Although the present invention is shown and described with respect to a regeneratively cooled expander cycle rocket engine, those skilled in the art will readily appreciate that the invention is applicable to other power cycles which produce pressurized gaseous propellant. The present invention, shown in FIG. 2, includes elements 11 through 25 of the conventional rocket propulsion system of FIG. 1. However, the hydrogen tank pressurization flow is routed through a boost pump line 30 to drive the boost pump turbines 15, 16 prior to entry into the hydrogen tank 11. The turbines 15, 16 drive the boost pumps 13, 14 while at the same time expanding the hydrogen gas to the lower pressure needed to maintain the hydrogen tank pressure. The pressure drop orifices in the bypass line 26 of the prior art rocket system are thus replaced by turbines 15, 16 which produce usable work from the expanding hydrogen gas. Although not shown in FIG. 2, in actual practice a small portion of the flow in the boost pump line 30 would bypass the turbines and flow directly to the hydrogen tank 11 through a secondary line and controller to ensure the hydrogen tank pressurization at the desired level.

The preferred embodiment of the present invention further includes an accumulator tank 31 pressurized with helium or gaseous hydrogen to drive the boost pumps 13, 14 independent of the primary pumps 19, 20 at engine start-up. An accumulator valve 32 provides selective release of the gas in the accumulator tank 31, and a check valve 33 directs the flow of gas released from the accumulator tank 31 through the boost pump turbines 15, 16 and into the hydrogen tank 11.

In operation of the present invention, the accumulator tank 31 must be initially pre-charged with helium or gaseous hydrogen. The engine may then be started by opening the accumulator valve 32 and releasing the stored gas. The released gas flows through the boost pump line 30, driving the boost pumps 13, 14 through the associated turbines 15, 16 and then flowing to the hydrogen tank 11. The accumulator tank 31 is recharged during engine operation and the accumulator valve 32 is closed in preparation for subsequent restart.

Figure 2:
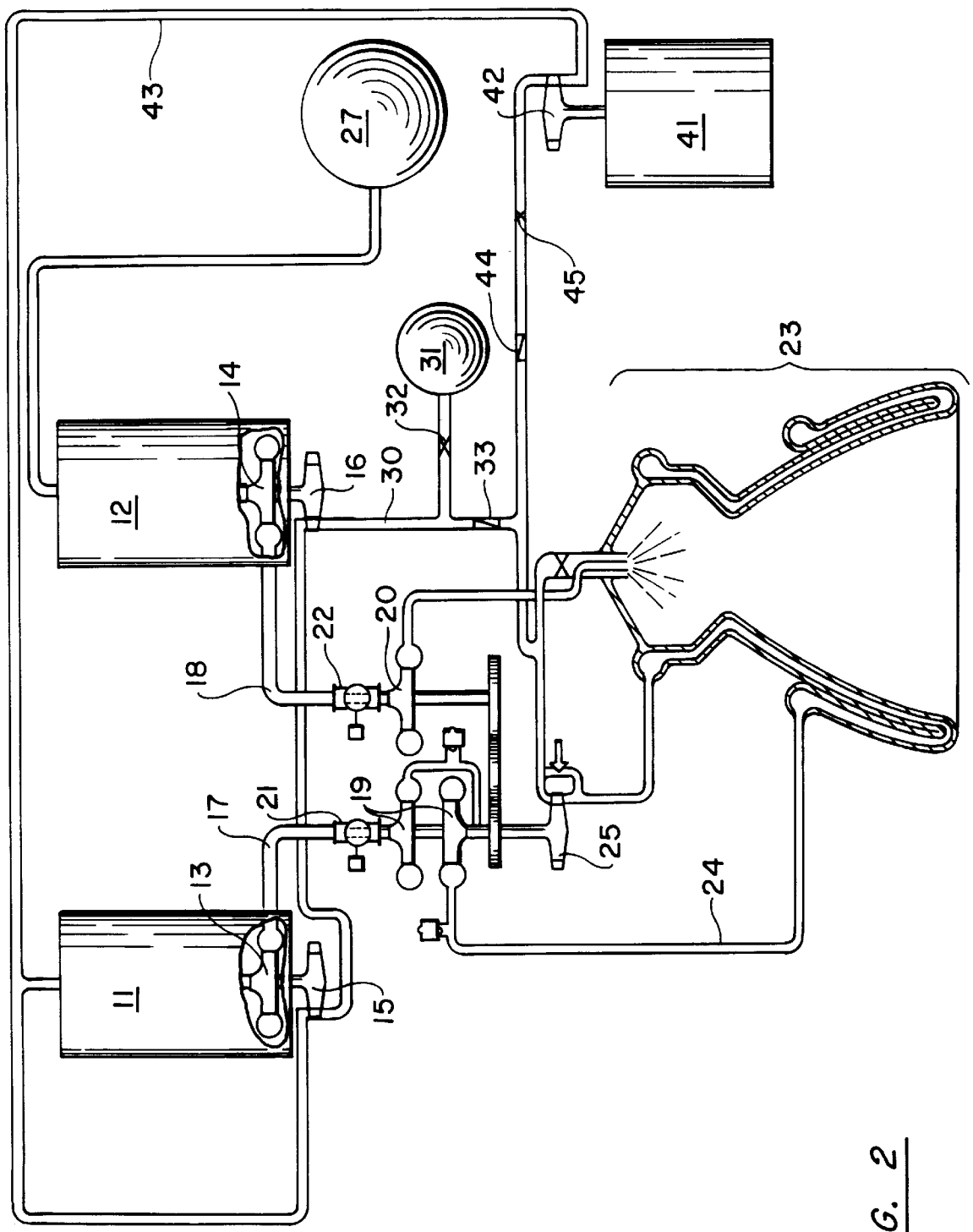
FIG. 2 is a schematic diagram of an expander cycle rocket engine of the present invention.

The present invention may further include auxiliary systems 41 such as electrical generators, thrust vector control systems, or hydraulic systems which are powered by at least one auxiliary turbine 42 driven by hydrogen tank pressurization flow. Although FIG. 2 shows the auxiliary turbine 42 being driven by auxiliary tank pressurization line 43 flow in parallel with the boost pump line 30 flow, those skilled in the art will readily appreciate that in some applications it may be desirable to drive the auxiliary turbine 42 in series with the boost pump turbines 15, 16 by incorporating the auxiliary turbine 42 into the boost pump line 30. The auxiliary tank pressurization line 43 may further include an auxiliary check valve 44 to prevent flow of hydrogen from the tank 11 back into the main propellant line 24, and an auxiliary control valve 45 to selectively control operation of the auxiliary turbine 42.

By eliminating the need for the monopropellant tanks 29 and the helium tank 27 for hydrogen tank 11 pressurization, the present invention reduces the weight and complexity of expander cycle rocket engines of the prior art. Although the helium tank 27 for oxygen tank 12 pressurization is still included in the present invention since no source of pressurized, gaseous oxygen is readily available from the engine cycle, the present invention provides a significant increase in overall engine efficiency as compared to rocket engines of the prior art.

Although this invention has been shown and described with respect to detailed embodiments thereof, it will be understood by those skilled in the art that various changes in form and detail thereof may be made without departing from the spirit and scope of the claimed invention.

I claim:

1. A rocket engine comprising
   propellant tanks, each tank containing liquid propellant and including a boost pump for pumping the propellant therein from the tank;
   at least one primary pump in series with one of the boost pumps for pumping one of the propellants through a main propellant line to a thrust chamber, said main propellant line including means for vaporizing the propellant therein;
   means for driving at least one of the boost pumps with the first part; and,
   a boost pump line connecting the main propellant line downstream of the means for vaporizing the propellant and said means for driving at least one of the boost pumps,
   said boost pump line including a check valve to prevent the vaporized propellant in the boost pump line from flowing back into the main propellant line.

2. The rocket engine of claim 1 further comprising
   an accumulator tank connected to the boost pump line, and
   means for diverting a portion of the first part from the boost pump line into the accumulator tank and selectively returning said portion to said boost pump line including
   an accumulator valve downstream of the check valve to selectively allow the portion to flow to or from the accumulator tank.

3. The rocket engine of claim 2 further comprising
   means for driving auxiliary systems of the rocket with the first part.

4. A method of utilizing a propellant to drive a boost pump of a rocket engine to pump propellant from a propellant tank comprising
   vaporizing the propellant flowing through a main propellant line to a thrust chamber during normal rocket engine operation;
   diverting a first part of the vaporized propellant from the main propellant line;
   storing a portion of the diverted first part in an accumulator tank;
   driving at least one of the boost pumps with the first part of vaporized propellant, thereby expanding the first part; and
   using the expanded first part to maintain a desired propellant pressure in one of the propellant tanks.

5. The method of claim 4 wherein the step of using the expanded first part to maintain a desired propellant pressure is followed by
   selectively discharging the portion from the accumulator tank at engine start-up; and,
   using the selectively discharged portion to drive at least one of the boost pumps until engine start-up is complete.

* * * * *